United States Patent
Shindo et al.

(10) Patent No.: US 10,213,996 B2
(45) Date of Patent: Feb. 26, 2019

(54) ANTI-WEAR SHEET, PRODUCTION METHOD FOR THE SAME, AND ANTI-WEAR-SHEET APPLICATION METHOD

(71) Applicants: MITSUBISHI HEAVY INDUSTRIES, LTD., Tokyo (JP); FUJI RESIN CO., LTD., Amagasaki-shi, Hyogo (JP)

(72) Inventors: Kentaro Shindo, Tokyo (JP); Takao Kuroiwa, Tokyo (JP); Hidehiko Gensui, Amagasaki (JP); Manabu Yamaguchi, Amagasaki (JP)

(73) Assignees: MITSUBISHI HEAVY INDUSTRIES, LTD., Tokyo (JP); FUJI RESIN CO., LTD., Amagasaki-Shi, Hyogo (JP)

( * ) Notice: Subject to any disclaimer, the term of this patent is extended or adjusted under 35 U.S.C. 154(b) by 39 days.

(21) Appl. No.: 15/103,222
(22) PCT Filed: Dec. 11, 2014
(86) PCT No.: PCT/JP2014/082811
§ 371 (c)(1),
(2) Date: Jun. 9, 2016
(87) PCT Pub. No.: WO2015/087962
PCT Pub. Date: Jun. 18, 2015

(65) Prior Publication Data
US 2016/0354999 A1 Dec. 8, 2016

(30) Foreign Application Priority Data
Dec. 12, 2013 (JP) .................... 2013-256902

(51) Int. Cl.
B32B 27/20 (2006.01)
B32B 7/06 (2006.01)
(Continued)

(52) U.S. Cl.
CPC .............. *B32B 27/20* (2013.01); *B32B 5/024* (2013.01); *B32B 7/06* (2013.01); *B32B 7/12* (2013.01);
(Continued)

(58) Field of Classification Search
CPC ......... B32B 27/20; B32B 27/08; B32B 27/30; B32B 27/306; B32B 5/024; B32B 7/06; B32B 7/12; B32B 2260/021; B32B 2262/101; B32B 2264/102; B32B 2264/105; B32B 2264/107; B32B 2307/41; B32B 2307/554; B32B 2405/00;
(Continued)

(56) References Cited

U.S. PATENT DOCUMENTS

2003/0099828 A1* 5/2003 Bundo .................... B32B 27/08
428/352

FOREIGN PATENT DOCUMENTS

| JP | 3-65339 A | 3/1991 |
| JP | 3043005 U | 11/1997 |

(Continued)

OTHER PUBLICATIONS

Machine translation of JP 2002361804, Dec. 18, 2002.*
(Continued)

*Primary Examiner* — Patricia L. Nordmeyer
(74) *Attorney, Agent, or Firm* — Birch, Stewart, Kolasch & Birch, LLP

(57) ABSTRACT

An anti-wear sheet for improving anti-wear performance of an object to be protected includes: a release film; a resin layer disposed on the release film and including photo-curable resin and hard particles supported by the photo-curable resin; and a light-shielding film disposed on an opposite side of the resin layer from the release film.

9 Claims, 4 Drawing Sheets

(51) Int. Cl.
  *B64C 3/00* (2006.01)
  *F04D 29/18* (2006.01)
  *F04D 29/38* (2006.01)
  *B64C 11/20* (2006.01)
  *B32B 7/12* (2006.01)
  *B32B 27/30* (2006.01)
  *B32B 27/08* (2006.01)
  *B32B 5/02* (2006.01)

(52) U.S. Cl.
  CPC .............. *B32B 27/08* (2013.01); *B32B 27/30* (2013.01); *B32B 27/306* (2013.01); *B64C 3/00* (2013.01); *B64C 11/205* (2013.01); *F04D 29/181* (2013.01); *F04D 29/38* (2013.01); *B32B 2260/021* (2013.01); *B32B 2262/101* (2013.01); *B32B 2264/102* (2013.01); *B32B 2264/105* (2013.01); *B32B 2264/107* (2013.01); *B32B 2307/41* (2013.01); *B32B 2307/554* (2013.01); *B32B 2405/00* (2013.01); *B32B 2556/00* (2013.01); *B32B 2571/00* (2013.01); *B32B 2605/18* (2013.01)

(58) Field of Classification Search
  CPC ............ B32B 2556/00; B32B 2571/00; B32B 2605/18; B64C 3/00; B64C 11/205; F04D 29/181; F04D 29/38
  See application file for complete search history.

(56) References Cited

FOREIGN PATENT DOCUMENTS

| JP | 11-61361 A | 3/1999 |
| JP | 2002-18991 A | 1/2002 |
| JP | 2002-265635 A | 9/2002 |
| JP | 2002-361804 A | 12/2002 |
| JP | 2003-71994 A | 3/2003 |
| JP | 2006-104394 A | 4/2006 |

OTHER PUBLICATIONS

Extended European Search Report, dated Nov. 2, 2016, for European Application No. 14870040.4.
Chinese Office Action and machine translation dated Jun. 26, 2017, for Chinese Application No. 201480067000.1.
International Preliminary Report on Patentability and Written Opinion of the International Searching Authority (Forms PCT/IB/338, PCT/IB/373, PCT/IB/326 and PCT/ISA/237), dated Jun. 23, 2016, for International Application No. PCT/JP2014/082811, with an English translation of the Written Opinion.
International Search Report (Forms PCT/ISA/220 and PCT/ISA/210), dated Mar. 17, 2015, for International Application No. PCT/JP2014/082811.
Japanese Notification of Reasons for Refusal, dated Jul. 7, 2017, for Japanese Application No. 2013-256902, along with a English machine translation.

* cited by examiner

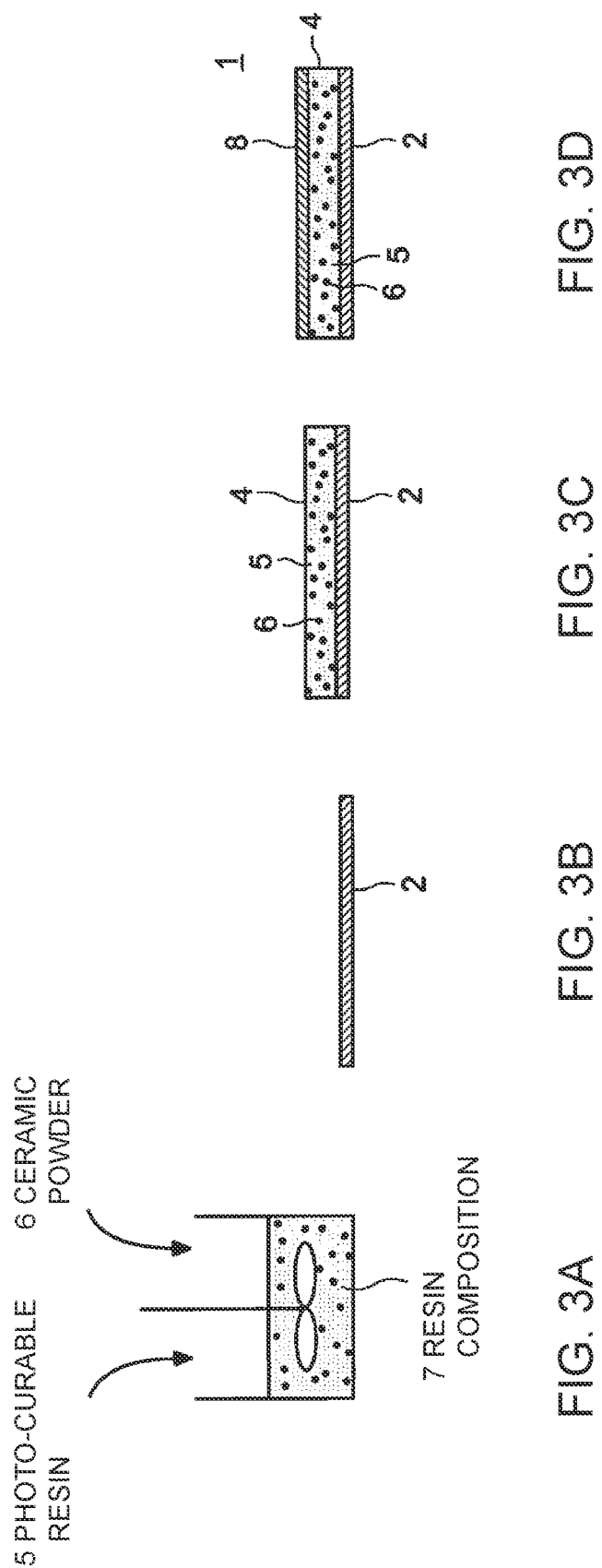

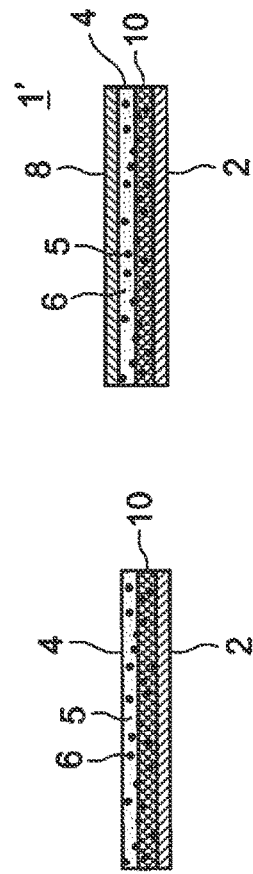
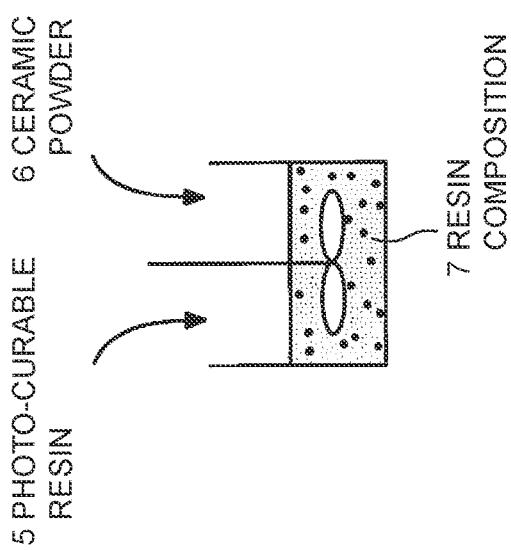

ANTI-WEAR SHEET, PRODUCTION METHOD FOR THE SAME, AND ANTI-WEAR-SHEET APPLICATION METHOD

TECHNICAL FIELD

The present disclosure relates to an anti-wear sheet for improving anti-wear performance of an object to be protected, a production method for the same, and an anti-wear-sheet application method.

BACKGROUND ART

In general, an anti-wear material is often applied to a location of wear on equipment such as a wind turbine blade, an airplane blade, or a fan or an inner wall surface of piping of various industrial plants, for instance, to protect the equipment from wear.

For instance, a wind turbine blade may be damaged by erosion from being repetitively hit by rain drops or dust. Especially, in recent years, blades are increased in size and damage is more serious at blade tips with an increased tip speed, which may lead to a rapid decrease in power-generation efficiency. Thus, a resin liner is applied to a location of wear on a blade to prevent wear. Furthermore, a sea-water pipe for cooling an industrial plant may be damaged by erosion from carrying seawater containing sand. Thus, a liner is applied to an inner wall surface of a pipe to prevent abrasion loss of the pipe.

As one of the methods of producing an anti-wear material for such usages, Patent Document 1 discloses a method of forming a resin layer on an object to be protected. In this method, mixture of resin particles and ceramic powder is disposed on an object to be protected, and the mixture is pressurized while being heated, and thereby a resin layer including ceramic powder is formed on the object to be protected.

CITATION LIST

Patent Literature

Patent Document 1: JPH3-65339A

SUMMARY

Problems to be Solved

However, the method described in Patent Document 1 involves placing mixture of resin particles and ceramic powder on an object to be protected, as well as pressurizing and melting the mixture, and thus application would be difficult without well-prepared facilities. Thus, it may be difficult to adopt the method described in Patent Document 1 for on-site repair of an object to be protected that has been damaged by erosion.

Meanwhile, besides the method described in Patent Document 1, an anti-wear layer can be formed on an object to be protected by applying a resin composition in slurry form (coating) containing ceramic powder onto the object.

In this method, however, increasing the amount of additive ceramic powder to achieve higher anti-wear performance may lead to a decrease in fluidity of the resin composition, which makes the application work difficult. Accordingly, it may be difficult to improve anti-wear performance and ensure good workability at the same time.

An object of at least one embodiment of the present invention is to provide an anti-wear sheet which can be applied without extensive facilities and which can achieve both improved anti-wear performance and high workability, as well as a method of producing the same and a method of applying an anti-wear sheet.

Solution to the Problems

An anti-wear sheet for improving anti-wear performance of an object to be protected, according to at least one embodiment of the present invention, comprises: a release film; a resin layer disposed on the release film and including photo-curable resin and hard particles supported by the photo-curable resin; and a light-shielding film disposed on an opposite side of the resin layer from the release film.

With the above anti-wear sheet, it is possible to increase the contained amount of the hard particles without strict limitation imposed for the sake of workability. Specifically, in the above embodiments, the contained amount of the hard particles has less influence on workability than in a method of forming an anti-wear layer by applying a resin composition in slurry form (coating) containing ceramic powder to an object to be protected, and thus it is possible to increase the contained amount of the hard particles in the resin layer of the anti-wear sheet to improve anti-wear performance. Accordingly, it is possible to improve anti-wear performance and ensure good workability at the same time.

Further, the photo-curable resin supports the hard particles and forms the resin layer, and thereby the resin layer can be cured basically by light irradiation alone, which makes it possible to improve workability. For instance, while the photo-curable resin can be replaced by thermo-setting resin or thermoplastic resin, a device for heating the resin layer would be required in that case, which makes application too extensive and difficult to be performed at a high altitude or in a narrow space. Moreover, uniform heating is difficult, and thus results may be uneven in a finished product. On the other hand, if the photo-curable resin is used, it is possible to cure the resin layer uniformly by using natural light without involving an elaborate device for application, for instance, and thereby high workability can be achieved. Further, with the light-shielding film disposed on a side of the resin layer, it is possible to suppress curing of the resin layer while the resin layer is being attached to the object to be protected after the release film is peeled off. It should be noted that the release film may also have a light-shielding property. Moreover, with the release film disposed on the other side of the resin layer, it is possible to prevent the resin layer from adhering to another substance during storage.

In some embodiments, the anti-wear sheet further comprises a shape-maintaining base material embedded in the resin layer.

Accordingly, even if the anti-wear sheet has large dimensions or area, the shape-maintaining base material maintains the shape of the sheet to some extent, and thereby transportation and application of the anti-wear sheet to an object to be protected are facilitated.

In some embodiments, a ratio by weight of the hard particles to the photo-curable resin is from 1 to 6.

Accordingly, with the ratio by weight of the hard particles to the photo-curable resin being one or more, it is possible to obtain an anti-wear sheet with a small amount of abrasion loss and high anti-wear performance. Also, with the ratio by weight of the hard particles to the photo-curable resin being six or less, it is possible to prevent generation of a poorly-cured section.

In some embodiments, the resin layer has a thickness of from 1 min to 5 mm.

With the resin layer having a thickness of 1 mm or more, a layer can be readily formed during production of the anti-wear sheet, and sufficient anti-wear performance can be readily ensured for the resin layer. Also, with the resin layer having a thickness of 5 mm or less, sufficient light permeability can be achieved for the resin layer, and the resin layer can be light-cured securely during application of the anti-wear sheet.

In an embodiment, the photo-curable resin comprises vinyl ester resin.

In another embodiment, the hard particles comprises ceramic powder. Further, the hard particles may comprise ceramic powder containing alumina.

A method of producing an anti-wear sheet for improving anti-wear performance of an object to be protected, according to at least one embodiment of the present invention, comprises: a preparing step of adding hard particles to photo-curable resin to prepare a resin composition which includes the photo-curable resin and the hard particles and which has fluidity; a forming step of forming the resin composition into a sheet shape on one of a release film or a light-shielding film to obtain a resin layer; and an attaching step of attaching the other one of the release film or the light-shielding film onto the resin layer.

With the above anti-wear sheet obtained by the above method of producing an anti-wear sheet, it is possible to increase the contained amount of the hard particles without strict limitation imposed for the sake of workability. Specifically, in the above embodiments, the contained amount of the hard particles has less influence on workability than in a method of forming an anti-wear layer by applying a resin composition in slurry form (coating) containing ceramic powder to an object to be protected, and thus it is possible to increase the contained amount of the hard particles in the resin layer of the anti-wear sheet to improve anti-wear performance. Accordingly, it is possible to improve anti-wear performance and ensure good workability at the same time.

Further, since the photo-curable resin supports the hard particles and forms the resin layer, and the resin layer can be cured basically by light irradiation alone, which makes it possible to improve workability. Further, with the light-shielding film disposed on a side of the resin layer, it is possible to suppress curing of the resin layer while the resin layer is being attached to the object to be protected after the release film is peeled off. It should be noted that the release film may also have a light-shielding property. Moreover, with the release film disposed on the other side of the resin layer, it is possible to prevent the resin layer from adhering to another substance during storage.

In some embodiments, the preparing step comprises dispersing the photo-curable resin and the hard particles in a solvent to prepare the resin composition having fluidity, and the solvent is volatilized after the forming step.

Accordingly, it is possible to include a sufficient amount of hard particles, and to produce an anti-wear sheet with a high anti-wear property.

In some embodiments, the forming step comprises embedding a shape-maintaining base material in the resin layer.

Accordingly, even an anti-wear sheet with a large length or diameter has a certain shape-maintaining function, and thereby it is possible to attach the anti-wear sheet readily to an object to be protected.

In some embodiments, the preparing step comprises adding the hard particles to the photo-curable resin so that a ratio by weight of the hard particles to the photo-curable resin is from 1 to 6.

Accordingly, with the ratio by weight of the hard particles to the photo-curable resin being one or more, it is possible to obtain an anti-wear sheet with a small amount of abrasion loss and high anti-wear performance. Also, with the ratio by weight of the hard particles to the photo-curable resin being 6 or less, it is possible to prevent generation of a poorly-cured section.

In some embodiments, the forming step comprises forming the resin composition into a sheet shape so that the resin layer has a thickness of from 1 mm to 5 mm.

With the resin layer having a thickness of 1 mm or more, a layer can be readily formed during production of the anti-wear sheet, and sufficient anti-wear performance can be readily ensured for the resin layer. Also, with the resin layer having a thickness of 5 mm or less, sufficient light permeability can be achieved for the resin layer, and the resin layer can be light-cured securely during application of the anti-wear sheet.

A method of applying an anti-wear sheet for improving anti-wear performance of an object to be protected to the object, the anti-wear sheet comprising a release film, a resin layer disposed on the release film and including photo-curable resin and hard particles supported by the photo-curable resin, and a light-shielding film disposed on an opposite side of the resin layer from the release film, according to at least one embodiment of the present invention, comprises: a release-film removing step of removing the release film from the anti-wear sheet; a release-film attaching step of attaching the release film to a protection surface of the object to be protected; a light-shielding-film removing step of removing the light-shielding film from the release-film attached to the object to be protected; and a curing step of curing the resin layer by irradiating the resin layer exposed by removal of the light-shielding film with light.

According to the above method of applying an anti-wear sheet, it is possible to increase the contained amount of the hard particles in a resin layer of an anti-wear sheet without strict limitation imposed for the sake of workability. Specifically, in the above embodiments, the contained amount of the hard particles has less influence on workability than in a method of forming an anti-wear layer by applying a resin composition in slurry form (coating) containing ceramic powder to an object to be protected, and thus it is possible to increase the contained amount of the hard particles in the resin layer of the anti-wear sheet to improve anti-wear performance. Accordingly, it is possible to improve anti-wear performance and ensure good workability at the same time.

Further, since the photo-curable resin supports the hard particles and forms the resin layer, the resin layer can be cured basically by light irradiation alone, which makes it possible to improve workability. Further, with the light-shielding film disposed on a side of the resin layer, it is possible to suppress curing of the resin layer while the resin layer is being attached to the object to be protected after the release film is peeled off. It should be noted that the release film may also have a light-shielding property. Moreover, with the release film disposed on the other side of the resin layer, it is possible to prevent the resin layer from adhering to another substance during storage.

Advantageous Effects

According to at least one embodiment of the present invention, it is possible to improve anti-wear performance of a resin layer and ensure good workability of an anti-wear sheet at the same time. Further, since the photo-curable resin supports the hard particles and forms the resin layer, the resin layer can be cured basically by light irradiation alone, which makes it possible to improve workability.

BRIEF DESCRIPTION OF DRAWINGS

FIGS. 3A to 3D are diagrams showing a process of producing an anti-wear sheet according to an embodiment.

FIGS. 4A to 4E are diagrams showing a process of producing an anti-wear sheet according to another embodiment.

DETAILED DESCRIPTION

Embodiments of the present invention will now be described with reference to the accompanying drawings. It is intended, however, that unless particularly specified, dimensions, materials, shapes, relative positions and the like of components described in the embodiments shall be interpreted as illustrative only and not intended to limit the scope of the present invention.

An anti-wear sheet according to an embodiment of the present invention is used to improve anti-wear performance of an object to be protected.

An anti-wear sheet according to embodiments of the present invention will now be described, and then a method of producing the anti-wear sheet and a method of applying the anti-wear sheet will be described in this order.

Figure 1:
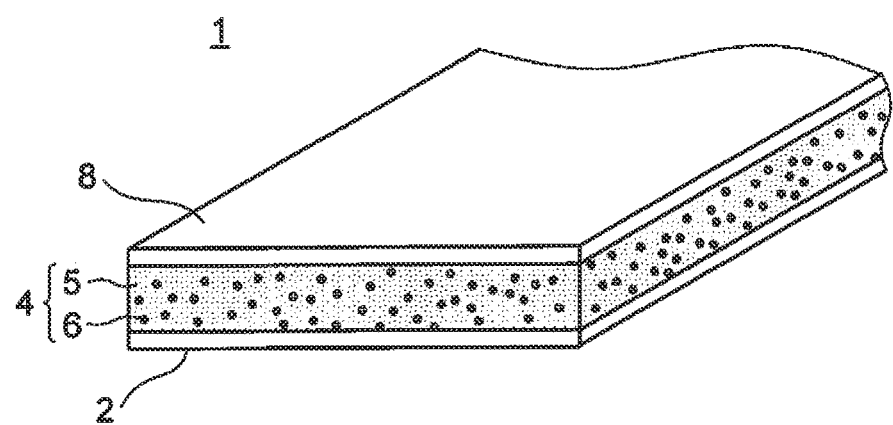
FIG. 1 is a perspective view of an anti-wear sheet according to an embodiment.

FIG. 1 is a perspective view of an anti-wear sheet according to an embodiment.

As illustrated in the drawing, in an embodiment, the anti-wear sheet 1 includes a release film 2, a resin layer 4, and a light-shielding film 8.

The release film 2 is disposed on a side of the resin layer 4, and is readily separatable from the resin layer 4. For instance, the release film 2 may be a film coated with silicone. The release film 2 may have a light-shielding property. Specifically, the release film 2 includes a material capable of absorbing or reflecting light having a wavelength that promotes polymerizing reaction of photo-curable resin 5 described below.

The resin layer 4 includes the photo-curable resin 5 and ceramic powder 6 supported by the photo-curable resin 5.

The photo-curable resin 5 is in a non-cured or half-cured state, and has an adhesive property (tack) strong enough to adhere the resin layer 4 to an object to be protected. The photo-curable resin 5 is not particularly limited as long as the photo-curable resin 5 is such a resin that polymerizing reaction of the resin develops by being irradiated with light of a specific wavelength, and may be epoxy resin, vinyl ester resin, or the like.

The ceramic powder 6 may contain alumina. Instead of the ceramic powder 6, optional hard particles (e.g. metal powder) harder than the photo-curable resin 5 may be used.

The resin layer 4 may have a thickness of from 1 mm to 5 mm.

With the resin layer 4 having a thickness of 1 mm or more, a layer can be readily formed during production of the anti-wear sheet 1, and sufficient anti-wear performance can be readily ensured for the resin layer 4. Also, with the resin layer 4 having a thickness of 5 mm or less, sufficient light permeability can be achieved for the resin layer 4, and the resin layer 4 can be light-cured securely during application of the anti-wear sheet 1.

Further, the ratio by weight of the ceramic powder 6 to the photo-curable resin 5 may be from 1 to 6.

Accordingly, with the ratio by weight of the ceramic powder 6 to the photo-curable resin 5 being 1 or more, it is possible to form the anti-wear sheet 1 with a small amount of abrasion loss and high anti-wear performance. Also, with the ratio by weight of the ceramic powder 6 to the photo-curable resin 5 being 6 or less, it is possible to prevent generation of a poorly-cured section.

The light-shielding film 8 is disposed on the opposite side of the resin layer 4 from the release film 2. Further, the release film 8 has a light-shielding property. The light-shielding film 8 includes a material capable of absorbing or reflecting light having a wavelength that promotes polymerizing reaction of the photo-curable resin 5. Further, the light-shielding film 8 may be readily separatable from the resin layer 4.

Figure 2:
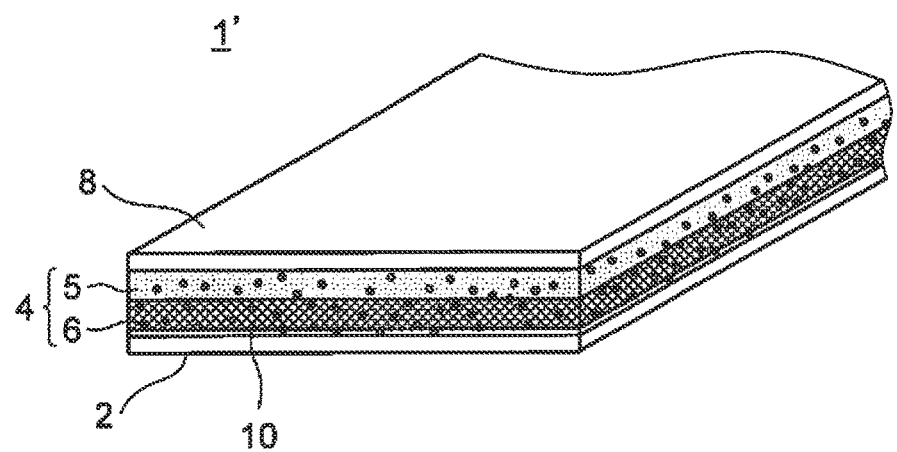
FIG. 2 is a perspective view of an anti-wear sheet according to another embodiment.

FIG. 2 is a perspective view of an anti-wear sheet according to another embodiment. In FIG. 2, the same parts as those in FIG. 1 are associated with the same reference numerals and not described in detail.

As illustrated in the drawing, in an embodiment, the anti-wear sheet 1' includes the release film 2, the resin layer 4 with a glass fiber 10, and the light-shielding film 8.

The glass fiber 10 is embedded in the resin layer 4 to serve as a shape-maintaining base material. A shape-maintaining base material to be embedded in the resin layer 4 is not particularly limited as long as the shape-maintaining base material can help maintain the shape of the resin layer 4 in a non-cured or half-cured state, and may be a material other than the glass fiber 10.

The glass fiber 10 may include fibers laid in one direction, or woven fibers.

Further, the glass fiber 10 may be disposed on a side adjacent to the release film 2 within the resin layer 4. The glass fiber 10 mainly functions as a shape-maintaining base material, and has little or no contribution to anti-wear performance. Thus, with the glass fiber 10 being disposed on the side of an object to be protected (i.e., on the side adjacent to the release film 2), it is possible to improve the shape-maintaining performance without sacrificing the anti-wear performance of the anti-wear sheet 1'.

Accordingly, even if the anti-wear sheet 1' has large dimensions or area, the shape-maintaining base material (glass fiber 10) maintains the shape of the anti-wear sheet 1' to some extent, and thereby transportation of the anti-wear sheet 1' and application of the anti-wear sheet 1' to an object 20 to be protected are facilitated.

A method of producing an anti-wear sheet according to an embodiment will now be described in detail. FIGS. 3A to 3D are diagrams showing a process of producing an anti-wear sheet according to an embodiment.

In an embodiment, to start with, in a preparing step depicted in FIG. 3A, the ceramic powder 6 is added to the photo-curable resin 5 to prepare a resin composition 7 which includes the photo-curable resin 5 and the ceramic powder 6 and has fluidity. In this step, the photo-curable resin 5 and the ceramic powder 6 may be dispersed in a solvent to obtain the resin composition 7 in slurry form. Further, in the preparing step, the ceramic powder 6 may be added to the photo-curable resin 5 so that the ratio by weight of the ceramic powder 6 to the photo-curable resin 5 is from 1 to 6.

Next, in a forming step, the resin composition 7 prepared as in FIG. 3A is spread out to a uniform thickness on the release film 2 depicted in FIG. 3B, and thereby the resin layer 4 in FIG. 3C is obtained. If the resin composition 7 contains a solvent, the solvent may be volatilized from the resin composition 7 spread out onto the release film 2 to obtain the resin layer 4. Accordingly, it is possible to maintain a sheet shape even after moving the anti-wear sheet 1 in a finished state. In the forming step, the resin composition 7 may be formed into a sheet shape so that the resin layer 4 has a thickness of from 1 mm to 5 mm.

After the solvent is volatilized, in an attaching step, the light-shielding film 8 is attached onto the resin layer 4 as depicted in FIG. 3D.

In another embodiment, as illustrated in FIG. 4, the resin layer 4 may include the glass fiber 10 embedded therein to serve as a shape-maintaining base material. FIGS. 4A to 4D are diagrams showing a process of producing an anti-wear sheet according to another embodiment.

In a preparing step depicted in FIG. 4A, the ceramic powder 6 is added to the photo-curable resin 5 to prepare the resin composition 7 including the photo-curable resin 5 and the ceramic powder 6 and having fluidity.

Next, in a forming step, the glass fiber 10 depicted in FIG. 4C is put on the release film 2 depicted in FIG. 4B. Next, the resin composition 7 prepared as in FIG. 4A is spread out to a uniform thickness to obtain the resin layer 4 in FIG. 4D. Accordingly, the glass fiber 10 is put on the release film 2 and then the resin composition 7 is applied to the release film 2 so that the glass fiber 10 is disposed on the side of the object 20 to be protected, and thereby it is possible to improve the shape-maintaining performance without sacrificing the anti-wear performance of the anti-wear sheet 1'. If the resin composition 7 contains a solvent, the solvent may be volatilized from the resin composition 7 spread out onto the release film 2 to obtain the resin layer 4. Then, in an attaching step, the light-shielding film 8 is attached to the resin layer 4 as depicted in FIG. 4E.

The production methods described with references to FIGS. 3A to 3D and FIGS. 4A to 4E may be performed by using either a roll-to-roll processing or a single-wafer processing.

In the roll-to-roll processing, the release film 2 and the light-shielding film 8 are reeled out from respective rolls, and moved while undergoing the above described forming step and attaching step, and then the anti-wear sheet 1, 1' in a finished state is reeled again to create a roll. In contrast, in the single-wafer processing, the anti-wear sheet 1 is processed by pieces, by applying the resin composition 7 to the release film 2 to form the resin layer 4, and then attaching the light-shielding film 8 to the resin layer 4. In the single-wafer processing, the light-shielding film 8 may be prepared in advance, the resin composition 7 may be applied onto the light-shielding film 8 to form the resin layer 4, and the release film 2 may be attached to the resin layer 4.

With regard to storage, the anti-wear sheet 1, 1' produced as described above may be stored in a light-shielding bag to prevent photo-curable resin from starting to cure. Such a light-shielding bag includes a material capable of absorbing or reflecting light having a wavelength that promotes polymerizing reaction of the photo-curable resin 5.

Next, with reference to FIG. 5, a method of applying the anti-wear sheet 1 depicted in FIG. 1 or the anti-wear sheet 1 produced by the production method described with reference to FIG. 3 will now be described.

Figure 5A:
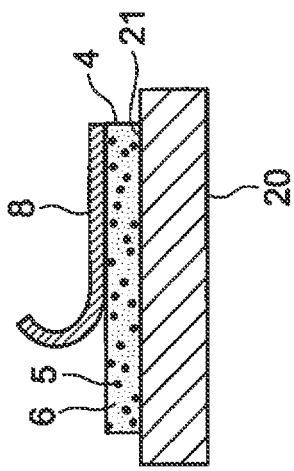
FIGS. 5A to 5E are diagrams showing a process of applying an anti-wear sheet according to an embodiment.
Figure 5B:
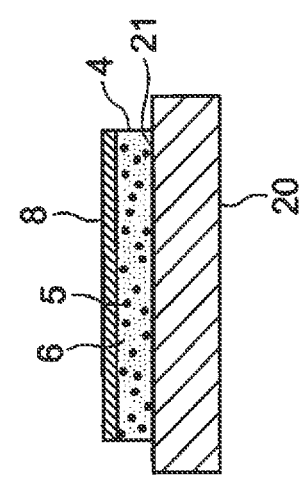
Figure 5C:
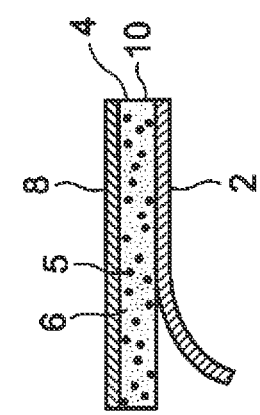
Figure 5E:
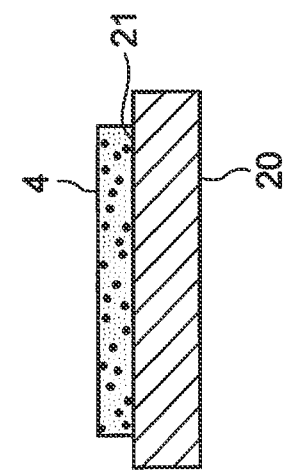
Figure 5D:
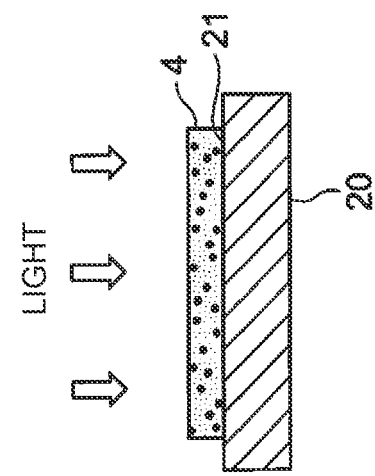

To start with, in a release-film removing step, the release film 2 of the anti-wear sheet 1 depicted in FIG. 5A is peeled off. Then, in a release-film attaching step, as depicted in FIG. 5B, the anti-wear sheet 1 is placed on the object 20 to be protected so that a surface of the anti-wear sheet 1 exposed by removal of the release film 2 contacts a protection surface 21 of the object 20 to be protected. Subsequently, in a light-shielding-film removing step, as depicted in FIG. 5C, the light-shielding film 8 is removed from the release film attached to the protection surface 21 of the object 20 to be protected. Then, as depicted in FIG. 5D, in a curing step, the resin layer 4 exposed by removal of the light-shielding film 8 is irradiated with light and cured. It is sufficient if light to irradiate the resin layer 4 includes light of a wavelength that promotes polymerizing reaction of the photo-curable resin 5, and the light may be natural light or artificial light emitted by an optional light source. Accordingly, as depicted in FIG. 5E, an anti-wear material including the resin layer 4 is applied onto the protection surface 21 of the object 20 to be protected.

As described above, according to the above embodiments, it is possible to increase the contained amount of the ceramic powder 6 without strict limitation imposed for the sake of workability. Specifically, in the above embodiments, the contained amount of the ceramic powder 6 has less influence on workability than in a method of forming an anti-wear layer by applying a resin composition in slurry form (coating) containing ceramic powder to an object to be protected, and thus it is possible to increase the contained amount of the ceramic powder 6 in the resin layer 4 of the anti-wear sheet 1 to improve anti-wear performance. Accordingly, it is possible to improve anti-wear performance and ensure good workability at the same time.

Further, the photo-curable resin 5 supports the ceramic powder 6 and forms the resin layer 4, and thereby the resin layer 4 can be cured basically by light irradiation alone, which makes it possible to improve workability. For instance, while the photo-curable resin 5 can be replaced by thermosetting resin or thermoplastic resin, a device for heating the resin layer 4 would be required in that case, which makes application too extensive and difficult to be performed at a high altitude or in a narrow space. Moreover, uniform heating is difficult, and thus results may be uneven in a finished product. On the other hand, if the photo-curable resin 5 is used, it is possible to cure the resin layer 4 uniformly by using natural light without involving an elaborate device for application, for instance, and thereby high workability can be achieved. Further, with the light-shielding film 8 disposed on a side of the resin layer 4, it is possible to suppress curing of the resin layer 4 while the resin layer 4 is being attached to the object 20 to be protected after the release film 2 is peeled off. It should be noted that the release film 2 may also have a light-shielding property. Moreover, with the release film 2 disposed on the other side of the resin layer 4, it is possible to prevent the resin layer 4 from adhering to another substance during storage.

Next, results of a Taber abrasion test for evaluating anti-wear performance of the anti-wear sheet 1 will now be described. A Taber abrasion test is a test to abrade a specimen by continuous friction with two abrading wheels that roll on the specimen mounted to a rotary platform like a disk. In the test, a Taber abrasion test was performed in accordance with Japanese Industrial Standard (JIS) K7204 on two specimens: the anti-wear sheet 1 produced by the production method described in FIG. 2 and attached to the object 20 to be protected, which is an embodiment; and a specimen with mixture coating of photo-curable resin and ceramic powder applied to an object to be protected, which is a comparative example.

In this test, photo-curable polyester resin was used as photo-curable resin, and alumina of a grain size #2000 was used as ceramic powder.

In the comparative example, photo-curable polyester resin and ceramic powder were mixed at a ratio of 100:150 to produce the coating. This coating was applied to a protection surface of an object to be protected to a thickness of 2 mm, and then irradiated for 20 minutes with ultraviolet from a UV lamp (1000 W) positioned at an irradiation distance of 200 mm from the application surface, before conducting the following abrasion test.

On the other hand, for the embodiment, photo-curable polyester resin and ceramic powder were mixed at a ratio of 100:350 to produce the resin composition. The resin composition was spread out onto the release film to form a resin layer of 2 mm thickness, and the light-shielding film was attached onto the resin layer to obtain the anti-wear sheet 1. This anti-wear sheet 1, from which the release film 2 is removed, was attached to the protection surface 21 of the object 20 to be protected, the light-shielding film 8 then peeled off, and then irradiated for 20 minutes with ultraviolet from a UV lamp (1000 W) positioned at an irradiation distance of 200 mm from the application surface, which is the same condition as the comparative example, before conducting the following abrasion test.

In the abrasion test, a tester provided with abrading wheels CS-17 was used to apply a load to each specimen for a duration of 1000 cycles, using loads of 1000 mg, and an amount of abrasion loss in a sheet by the abrading wheels was measured. As a result, the amount of abrasion loss from the object to be protected coated with the mixture coating of the comparative example was 80 mg, whereby the amount of abrasion loss from the object to be protected with the anti-wear sheet 1 of the embodiment attached thereto was 132 mg. The difference in the amount of abrasion loss between the comparative example and the embodiment may be due to the contained amount of ceramic powder. That is, in the embodiment, the anti-wear sheet I was produced and thus a large amount of ceramic powder could be contained, which may have been the reason why the amount of abrasion loss was reduced considerably. Accordingly, the anti-wear sheet 1 of the embodiment can achieve extremely high anti-wear performance and therefore is effective.

Embodiments of the present invention were described in detail above, but the present invention is not limited thereto, and various amendments and modifications may be implemented within a scope that does not depart from the present invention.

The anti-wear sheet described in the embodiments of the present invention can be applied to various wear locations, especially to wear locations damaged by erosion, such as a wind turbine blade, a rotary blade of a rotary-blade airplane, a fixed wing of a fixed-wing airplane (main wings, tail, aileron, etc.), and an axial fan or a piping inner wall surface of various industrial plants.

DESCRIPTION OF REFERENCE NUMERALS

1 Anti-wear sheet
2 Release film
4 Resin layer
5 Photo-curable resin
6 Ceramic powder
7 Resin composition
8 Light-shielding film
10 Glass fiber
20 Object to be protected
21 Protection surface

The invention claimed is:

1. An anti-wear sheet for improving anti-wear performance of an object to be protected, comprising:
 a release film;
 a resin layer disposed on the release film and including photo-curable resin and hard particles supported by the photo-curable resin; and
 a light-shielding film disposed on an opposite side of the resin layer from the release film; and
 a shape-maintaining base material embedded in the resin layer and disposed on a side adjacent to the release film within the resin layer,
 wherein the resin layer includes:
  a first region defined between the light-shielding film and the shape-maintaining base material and in which the shape-maintaining base material is not disposed; and
  a second region defined between the first region and the release film and in which the shape-maintaining base material is embedded, and
 wherein the photo-curable resin in the first region is the same as the photo-curable resin in the second region.

2. The anti-wear sheet according to claim 1, wherein a ratio by weight of the hard particles to the photo-curable resin is from 1 to 6.

3. The anti-wear sheet according to claim 1, wherein the resin layer has a thickness of from 1 mm to 5 mm.

4. The anti-wear sheet according to claim 1, wherein the photo-curable resin comprises vinyl ester resin.

5. The anti-wear sheet according to claim 1, wherein the hard particles include ceramic powder.

6. The anti-wear sheet according to claim 1,
 wherein the shape-maintaining material is displaced to the side adjacent to the release film within the resin layer.

7. The anti-wear sheet according to claim 1,
 wherein, in a thickness direction of the anti-wear sheet, a first distance between the shape-maintaining material and the light-shielding film is greater than a second distance between the shape-maintaining material and the release film.

8. A method of applying the anti-wear sheet according to claim 1 to an object to be protected, the method comprising:
 a release-film removing step of removing the release film from the anti-wear sheet;
 an anti-wear sheet attaching step of attaching the anti-wear sheet from which the release film is removed to a protection surface of the object to be protected;
 a light-shielding film removing step of removing the light-shielding film from the anti-wear sheet attached to the object to be protected; and
 a curing step of curing the resin layer by irradiating the resin layer exposed by removal of the light-shielding film with light.

9. A wind turbine blade, a rotary blade of an airplane, a fixed wing of an airplane or a rotary blade of an axial fan, comprising a surface covered with the anti-wear sheet according to claim 1.

* * * * *